(12) United States Patent
Shimamoto et al.

(10) Patent No.: US 11,141,825 B2
(45) Date of Patent: Oct. 12, 2021

(54) WORK POSITIONER

(71) Applicant: NABTESCO CORPORATION, Tokyo (JP)

(72) Inventors: Mitsuru Shimamoto, Mie (JP); Takayuki Okimura, Mie (JP); Koji Nakamura, Mie (JP); Takahiro Maekawa, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 308 days.

(21) Appl. No.: 15/783,252

(22) Filed: Oct. 13, 2017

(65) Prior Publication Data
US 2018/0111235 A1 Apr. 26, 2018

(30) Foreign Application Priority Data

Oct. 20, 2016 (JP) .............................. JP2016-206110

(51) Int. Cl.
B23Q 1/26 (2006.01)
B23Q 3/10 (2006.01)
(Continued)

(52) U.S. Cl.
CPC ................. *B23Q 1/26* (2013.01); *B23Q 1/44* (2013.01); *B23Q 1/525* (2013.01); *B23Q 3/103* (2013.01)

(58) Field of Classification Search
CPC . B23Q 1/26; B23Q 1/262; B23Q 1/44; B23Q 1/48; B23Q 1/50; B23Q 1/525;
(Continued)

(56) References Cited

U.S. PATENT DOCUMENTS 5,026,033 A 6/1991 Roxy
5,246,217 A 9/1993 Brot
(Continued)

FOREIGN PATENT DOCUMENTS

CN 104802023 A 7/2015
CN 105127787 A 12/2015
(Continued)

OTHER PUBLICATIONS

Extended European Search Report EP Application No. 17196892.8 dated Apr. 6, 2018.
(Continued)

*Primary Examiner* — Tyrone V Hall, Jr.
*Assistant Examiner* — Abbie E Quann
(74) *Attorney, Agent, or Firm* — Pillsbury Winthrop Shaw Pittman, LLP

(57) ABSTRACT

A work positioner includes a first work retaining portion for retaining a first workpiece, a first drive portion for outputting a first rotational force about a first rotation axis and imparting a first angular movement about the first rotation axis to the first work retaining portion, a bearing portion supporting the first work retaining portion in cooperation with the first drive portion, a base arranged away from the first rotation axis, a first support column extending along a first support axis extending from the base toward the first rotation axis and supporting the first drive portion, and a second support column extending along a second support axis extending between the base and the first rotation axis so as to be parallel to the first support axis and supporting the bearing portion. The first support column includes a plurality of first support column pieces arranged along the first support axis.

9 Claims, 12 Drawing Sheets

(51) Int. Cl.
  *B23Q 1/52*  (2006.01)
  *B23Q 1/44*  (2006.01)

(58) Field of Classification Search
  CPC ...... B23Q 1/54; B23Q 1/5418; B23Q 1/5468;
        B23Q 1/76; B23Q 1/763; B23Q 3/06;
        B23Q 3/061; B23Q 3/064; B23Q 3/103;
        B23Q 16/02; B23Q 16/10; B23Q 16/102;
                                      B23Q 3/10
  See application file for complete search history.

(56) References Cited

U.S. PATENT DOCUMENTS

| | | | |
|---|---|---|---|
| 5,501,123 | A | 3/1996 | Swann et al. |
| 5,526,715 | A | 6/1996 | Swann et al. |
| 5,562,277 | A | 10/1996 | Swann et al. |
| 5,825,655 | A | 10/1998 | Nakagawa et al. |
| 5,887,733 | A * | 3/1999 | Harvey ............ B23Q 3/103 211/182 |
| 10,105,803 | B1 * | 10/2018 | Stevens ............ B23Q 1/525 |
| 2005/0022350 | A1 | 2/2005 | Tokuma et al. |
| 2007/0048101 | A1 | 3/2007 | Beteille |
| 2009/0102109 | A1 | 4/2009 | Nuchter et al. |
| 2011/0203427 | A1 * | 8/2011 | Arana Beobide ...... B23Q 1/763 82/1.11 |
| 2014/0239568 | A1 | 8/2014 | Masuya |
| 2015/0209923 | A1 | 7/2015 | Jia |

FOREIGN PATENT DOCUMENTS

| | | |
|---|---|---|
| DE | 202004018795 U1 | 5/2006 |
| DE | 202014100702 U1 | 6/2014 |
| EP | 2282869 | 4/2012 |
| EP | 2282869 B1 | 4/2012 |
| FR | 2861004 A1 | 4/2005 |
| JP | 61-78534 U | 5/1986 |
| JP | 4-315535 A | 11/1992 |
| JP | 8-47880 A | 2/1996 |
| JP | 2005-28482 A | 2/2005 |
| TW | 200922734 A | 6/2009 |
| WO | 96/07507 A1 | 3/1996 |
| WO | 97/39655 A1 | 10/1997 |
| WO | 2009/132848 A1 | 11/2009 |

OTHER PUBLICATIONS

Office Action dated Oct. 22, 2020 issued in corresponding Chinese Patent Application No. 201710952641.0 with English translation (10 pgs.).

Office Action dated Jul. 14, 2020 issued in corresponding Japanese Patent Application No. 2016-206110 with English translation (12 pgs.).

Office Action dated Nov. 27, 2020 issued in corresponding European Patent Application No. 17196892.8 (6 pgs.).

Office Action dated Apr. 30, 2021, issued in corresponding Taiwanese Patent Application No. 106134287, with English language translation (8 pgs.).

* cited by examiner

WORK POSITIONER

CROSS-REFERENCE TO RELATED APPLICATIONS

This application is based on and claims the benefit of priority from Japanese Patent Application Serial No. 2016-206110 (filed on Oct. 20, 2016), the contents of which are hereby incorporated by reference in their entirety.

TECHNICAL FIELD

The present invention relates to a work positioner for setting a workpiece to be processed in an appropriate position and an appropriate posture.

BACKGROUND

A work positioner is used to set a workpiece to be processed in an appropriate position and an appropriate posture (see Japanese Patent Application Publication No. H08-47880). By such a work positioner, a workpiece is retained in an appropriate position and an appropriate posture with respect to a tool and thus is processed with accuracy.

A conventional type of work positioner is designed to be adapted to a shape and a size of a workpiece to be processed. Thus, when there are a plurality of workpieces different in shape and size, a plurality of work positioners suitable for these workpieces, respectively, are required. This signifies the need for multiple operations to design work positioners.

There also exists a work positioner designed to be capable of retaining a plurality of workpieces different in shape and size. Not many types of workpieces, however, can be handled by such a work positioner. Also, in some cases, a work positioner is excessively large compared with a workpiece retained thereby, resulting in adversely affecting processing accuracy and processing efficiency.

SUMMARY

It is an object of the present invention to provide a work positioner usable for multiple workpieces different in shape and size.

A work positioner according to one aspect of the present invention is provided with a first work retaining portion for retaining a first workpiece, a first drive portion for outputting a first rotational force about a first rotation axis and imparting a first angular movement about the first rotation axis to the first work retaining portion, a bearing portion supporting the first work retaining portion in cooperation with the first drive portion, a base arranged away from the first rotation axis, a first support column extending along a first support axis extending from the base toward the first rotation axis, the first support column supporting the first drive portion, and a second support column extending along a second support axis extending between the base and the first rotation axis so as to be parallel to the first support axis, the second support column supporting the bearing portion. The first support column includes a plurality of first support column pieces arranged in a row along the first support axis.

DESCRIPTION OF THE PREFERRED EMBODIMENTS

First Embodiment

In a case where a support column is splittable into a plurality of members, a distance between a rotation axis and a base can be adjusted so as to be adapted to a size and a shape of a workpiece. A first embodiment describes a work positioner provided with a support column having a split structure.

Figure 1:
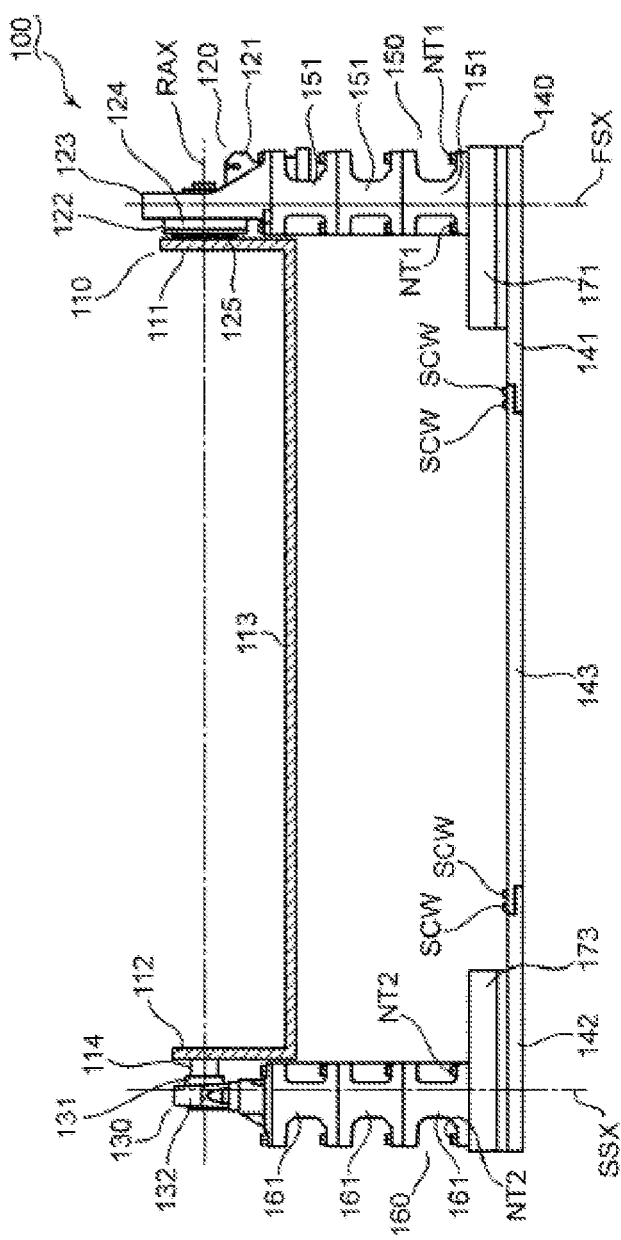
FIG. 1 is a schematic front view of a work positioner according to a first embodiment of the present invention.

FIG. 1 is a schematic front view of a work positioner 100 according to the first embodiment. With reference to FIG. 1, a description is given of the work positioner 100.

The work positioner 100 may be provided with a work retaining portion 110, a drive portion 120, a bearing portion 130, a base 140, a first support column 150, and a second support column 160. The work retaining portion 110 may be used to retain a workpiece (not shown). The work retaining portion 110 may be disposed in a space between the drive portion 120 (and the first support column 150) and the bearing portion 130 (and the second support column 160). In this embodiment, a workpiece retained by the work retaining portion 110 may be an example of a first workpiece.

The work retaining portion 110 may include a first side wall 111, a second side wall 112, a retaining plate 113, and a shaft 114. FIG. 1 shows a first rotation axis RAX. The first side wall 111 and the second side wall 112 may be substantially orthogonal to the first rotation axis RAX. The first side wall 111 may be secured to the drive portion 120. The second side wall 112 may be positioned adjacently to the bearing portion 130 and the second support column 160. The retaining plate 113 may extend between a lower end of the first side wall 111 and a lower end of the second side wall 112 so as to be substantially parallel to the first rotation axis RAX. A workpiece may be placed and secured on the retaining plate 113. The shaft 114 may extend from the second side wall 112 toward the bearing portion 130 along the first rotation axis RAX. The bearing portion 130 may be positioned on an opposite side to the first side wall 111 with respect to the second side wall 112. In this embodiment, the work retaining portion 110 may be an example of a first work retaining portion. It may also be possible that the first work retaining portion has a different structure allowing a workpiece to be retained (for example, a chuck structure). A principle of this embodiment may not be limited to a particular structure of the first work retaining portion.

The drive portion 120 may include a motor 121, a speed reducer 122, and a flange 123. The motor 121 may be mounted to the flange 123. The motor 121 may have a rotary shaft (not shown) connected to the speed reducer 122. The motor 121 may generate a drive force for driving the work retaining portion 110. The drive force may be outputted in the form of rotation of the rotary shaft of the motor 121.

The speed reducer 122 may include an outer cylinder 124 and a carrier 125. The outer cylinder 124 may have a substantially cylindrical shape. A major part of the carrier 125 may be housed in the outer cylinder 124. An end surface of the carrier 125 may be exposed from the outer cylinder 124. The end surface of the carrier 125 may be secured to the first side wall 111 of the work retaining portion 110.

The speed reducer 122 may include a gear mechanism (not shown) constructed within the outer cylinder 124. The rotary shaft of the motor 121 may be connected to the gear mechanism of the speed reducer 122. When the rotary shaft of the motor 121 rotates, a drive force may be increased in accordance with a speed reduction ratio determined by the gear mechanism and outputted in the form of rotation of the carrier 125 having a rotation speed lower than that of the rotary shaft of the motor 121. The carrier 125 may rotate about the first rotation axis RAX. The outer cylinder 124 may be secured to the flange 123, and thus during rotation of the carrier 125, the outer cylinder 124 may remain stationary. The carrier 125 may be disposed concentrically with the shaft 114.

The flange 123 may encircle the outer cylinder 124. The outer cylinder 124 may be secured by the flange 123. The flange 123 may retain the outer cylinder 124 so that a rotation center of the carrier 125 is substantially aligned with the first rotation axis RAX. Thus, a drive force generated by the motor 121 may be outputted in the form of rotation of the carrier 125 about the rotation axis RAX to the work retaining portion 110. As a result, the work retaining portion 110 may perform an angular movement about the first rotation axis RAX. A rotational force outputted from the carrier 125 may be an example of a first rotational force. Rotation of the work retaining portion 110 about the first rotation axis RAX may be an example of a first angular movement.

The bearing portion 130 may include a bearing 131 and a flange 132. A center of the bearing 131 may be substantially aligned with the first rotation axis RAX. The flange 132 may encircle the bearing 131. An outer race of the bearing 131 may be secured to the flange 132. An inner race of the bearing 131 can rotate about the first rotation axis RAX. It may also be possible that the bearing portion 130 is formed of a pillow block in general use.

The shaft 114 of the work retaining portion 110 may be fitted into the bearing 131. Thus, the bearing portion 130 can support the work retaining portion 110 in cooperation with the drive portion 120.

The base 140 may be away downward from the first rotation axis RAX. FIG. 1 shows a first support axis FSX and a second support axis SSX. The first support axis FSX is depicted at a position corresponding to the drive portion 120. The second support axis SSX is depicted at a position corresponding to the bearing portion 130. The first support axis FSX, extending from the base 140, may be orthogonal to the first rotation axis RAX in the drive portion 120. The second support axis SSX, extending from the base 140 parallel to the first support axis FSX, may be orthogonal to the first rotation axis RAX in the bearing portion 130.

The first support column 150 shown in FIG. 1 may include three first support column pieces 151. On the base 140, the three first support column pieces 151 may be stacked along the first support axis FSX. The drive portion 120 may be secured to an upper end of the first support column 150 and supported by the first support column 150.

The second support column 160 shown in FIG. 1 may include three second support column pieces 161. On the base 140, the three second support column pieces 161 may be stacked along the second support axis SSX. The bearing portion 130 may be secured to an upper end of the second support column 160 and supported by the second support column 160.

The second support column pieces 161 may be equal in shape and size to the first support column pieces 151. It may also be possible that the second support column pieces 161 are formed based on a common drawing to the first support column pieces 151. Thus, the first support column 150 and the second support column 160 can be constructed by using a reduced number of types of components. The feature that "the second support column pieces 161 may be equal in shape and size to the first support column pieces 151" may be applicable also to a case where there is any machining error between the first support column pieces 151 and the second support column pieces 161.

When a large workpiece is placed on the work retaining portion 110, there may be a case where a distance between the first rotation axis RAX and the base 140 is insufficient. In such a case, it may also be possible that a worker constructs the first support column 150 and the second support column 160 by using an additional first support column piece(s) 151 and an additional second support column piece(s) 161, respectively. In this case, the first support column 150 and the second support column 160 may be formed of more than three first support column pieces 151 and more than three second support column pieces 161, respectively, and thus a distance between the first rotation axis RAX and the base 140 may be increased to be suitable for the large workpiece.

When a small workpiece is placed on the work retaining portion 110, there may be a case where a distance between the first rotation axis RAX and the base 140 is too long. In such a case, it may also be possible that a worker removes one or two among the first support column pieces 151 and one or two among the second support column pieces 161 from the first support column 150 and the second support column 160, respectively. As a result, a distance between the first rotation axis RAX and the base 140 may be decreased to be suitable for the small workpiece.

<Other Features> A design engineer can incorporate various features into the work positioner 100. Features described below may not limit the principle of the foregoing embodiment. Instead, the following features can impart beneficial functions to the work positioner 100.

(Split Structure of Base) It may also be possible that a base is formed of a single plate material. In a case, however, where the base is splittable into a plurality of members, a distance between a first support column and a second support column can be adjusted so as to be adapted to a size and a shape of a workpiece. A base having a split structure will now be described.

Figure 2:
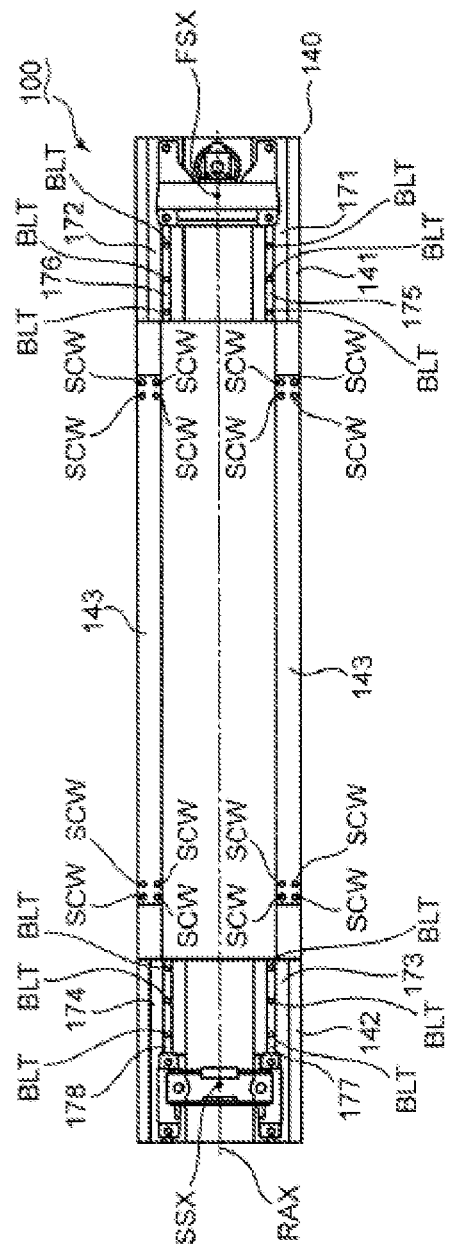
FIG. 2 is a schematic plan view of the work positioner shown in FIG. 1.

FIG. 2 is a schematic plan view of the work positioner 100. The work retaining portion 110 has been removed from the work positioner 100 shown in FIG. 2. With reference to FIG. 1 and FIG. 2, a further description is given of the work positioner 100.

The base 140 may include a first base portion 141, a second base portion 142, and two intermediate base portions 143. The first base portion 141 may be disposed at a position intersecting the first support axis FSX. The second base portion 142 may be disposed at a position intersecting the second support axis SSX. The intermediate base portions 143 may be formed of bar-shaped members extending between the first base portion 141 and the second base portion 142 so as to be substantially parallel to the first rotation axis RAX. The intermediate base portions 143 may be connected to the first base portion 141 and the second base portion 142 with a plurality of screws SCW. A worker can separate the intermediate base portions 143 from the first base portion 141 and the second base portion 142 by unscrewing the screws SCW. The intermediate base portions 143 may not be limited to being formed of bar-shaped members, and it may also be possible to use, for example, flat plate members to form the intermediate base portions 143.

It may also be possible that the first base portion 141 and the second base portion 142 are formed based on a common drawing. Thus, the base 140 can be constructed by using a reduced number of types of components.

Figure 3A:
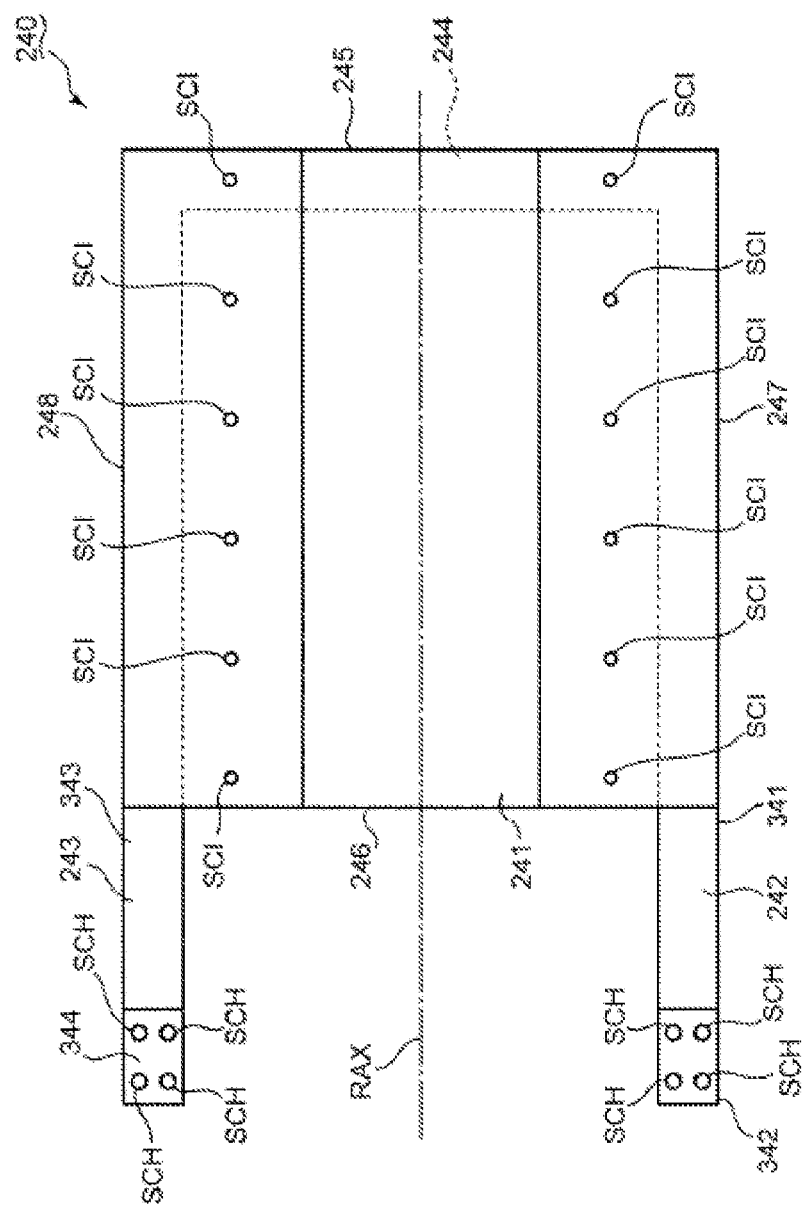
FIG. 3A is a schematic plan view of a base member used in the work positioner shown in FIG. 1.
Figure 3B:
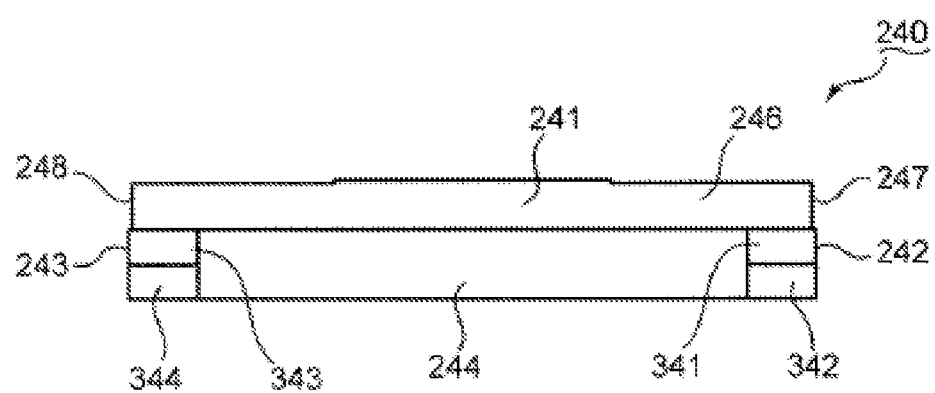
FIG. 3B is a schematic side view of the base member shown in FIG. 3A.

FIG. 3A is a schematic plan view of a base member 240. FIG. 3B is a schematic side view of the base member 240. With reference to FIG. 2 to FIG. 3B, a description is given of the base member 240. The base member 240 may be usable as each of the first base portion 141 and the second base portion 142. A description related to the base member 240 may be applied to each of the first base portion 141 and the second base portion 142.

The base member 240 may include a base plate 241, two arms 242 and 243, and a rib 244. As shown in FIG. 3A, the base plate 241 may have a substantially rectangular upper surface. The base plate 241 may include a first edge surface 245, a second edge surface 246, a third edge surface 247, and a fourth edge surface 248. The first edge surface 245, the second edge surface 246, the third edge surface 247, and the fourth edge surface 248 may form an outline of the rectangular upper surface of the base plate 241. The first edge surface 245 may be a surface elongated in a direction at a substantially right angle to the first rotation axis RAX. The second edge surface 246 may be a surface positioned on an opposite side to the first edge surface 245 and elongated in a direction at a substantially right angle to the first rotation axis RAX. The third edge surface 247 may extend between the first edge surface 245 and the second edge surface 246 so as to be substantially parallel to the rotation axis RAX. The fourth edge surface 248 may be positioned on an opposite side to the third edge surface 247 and extend between the first edge surface 245 and the second edge surface 246 so as to be substantially parallel to the rotation axis RAX.

The rib 244 may extend in a direction orthogonal to the first rotation axis RAX along the first edge surface 245 and protrude from a lower surface of the base plate 241. The arm 242 may be attached to the lower surface of the base plate 241. The arm 242 may extend from one end portion of the rib 244 along the third edge surface 247 and protrude from the second edge surface 246. The arm 243 may be attached to the lower surface of the base plate 241. The arm 243 may extend from the other end portion of the rib 244 along the fourth edge surface 248 and protrude from the second edge surface 246.

The arm 242 may include a support portion 341 and a connection portion 342. The support portion 341 may be substantially equal to the rib 244 in amount of protrusion from the lower surface of the base plate 241. A major part of the support portion 341 may be positioned below the base plate 241. The arm 243 and the rib 244 may support the base plate 241 in cooperation with each other. The connection portion 342 may protrude from a tip end surface of the support portion 341 in an extending direction of the first rotation axis RAX. The connection portion 342 may be thinner than the support portion 341. A lower surface of the connection portion 342 and a lower surface of the support portion 341 may be substantially flush with each other.

As shown in FIG. 3A, four screw holes SCH may be formed in the connection portion 342. Four among the screws SCW, which penetrate one end portion of one of the two intermediate base portions 143 shown in FIG. 2, may be screwed into the four screw holes SCH, respectively.

The arm 243 may include a support portion 343 and a connection portion 344. The support portion 343 may be substantially equal to the rib 244 in amount of protrusion from the lower surface of the base plate 241. A major part of the support portion 343 may be positioned below the base plate 241. The support portion 341 of the arm 242 and the rib 244 may support the base plate 241 in cooperation with each other. The connection portion 344 may protrude from a tip end surface of the support portion 343 in the extending direction of the first rotation axis RAX. The connection portion 344 may be thinner than the support portion 343. A lower surface of the connection portion 344 and the lower surface of the support portion 343 may be substantially flush with each other.

As shown in FIG. 3A, four screw holes SCH may be formed in the connection portion 344. Four among the screws SCW, which penetrate one end portion of the other of the two intermediate base portions 143 shown in FIG. 2, may be screwed into the four screw holes SCH, respectively.

Figure 4:
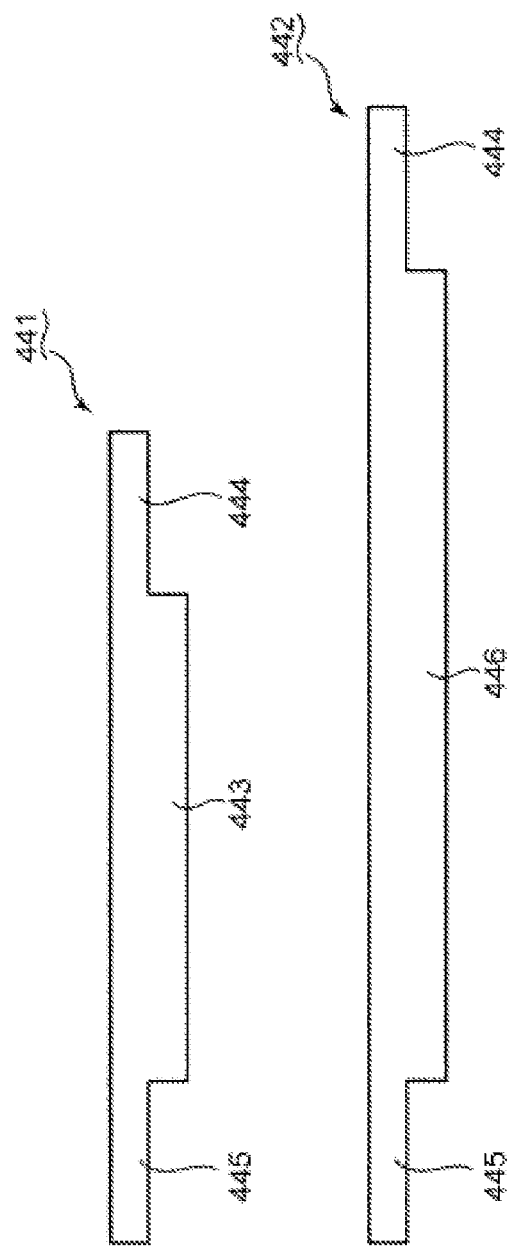
FIG. 4 is a schematic front view of two rod members used in the work positioner shown in FIG. 1.

FIG. 4 is a schematic front view of two rod members 441 and 442. With reference to FIG. 2, FIG. 3A, and FIG. 4, a description is given of the two rod members 441 and 442. Each of the two rod members 441 and 442 may be usable as each of the intermediate base portions 143. A description related to each of the two rod members 441 and 442 may be applied to the intermediate base portions 143.

The rod member 441 may include an intermediate portion 443, a first end portion 444, and a second end portion 445. The intermediate portion 443 may be substantially equal in thickness to the support portion 341 of the arm 242 and the support portion 343 of the arm 243 described with reference to FIG. 3A. The first end portion 444 may be linked to one end portion of the intermediate portion 443 and form one end portion of the rod member 441. The second end portion 445 may be linked to the other end portion of the intermediate portion 443 and form the other end portion of the rod member 441. Each of the first end portion 444 and the second end portion 445 may be thinner than the intermediate portion 443.

The first end portion 444 may be connected to one of the arms 242 and 243 of the base member 240 used as the first base portion 141 or the second base portion 142. The first end portion 444 may be overlaid on one of the connection portions 342 and 344. A sum of a thickness of the first end portion 444 and a thickness of one of the connection portions 342 and 344 may be substantially equal to that of the intermediate portion 443. Four through holes (not shown) configured to communicate with the four screw holes SCH described with reference to FIG. 3A may be formed through the first end portion 444. Four among the screws SCW, which penetrate one end portion of one of the two intermediate base portions 143 shown in FIG. 2, may be inserted into the four through holes formed through the first end portions 444 and screwed into the four screw holes SCH, respectively.

The second end portion 445 may be connected to one of the arms 242 and 243 of the base member 240 used as the first base portion 142 or the second base portion 141. The second end portion 445 may be overlaid on one of the connection portions 342 and 344. A sum of a thickness of the second end portion 445 and a thickness of one of the connection portions 342 and 344 may be substantially equal to that of the intermediate portion 443. Four through holes (not shown) configured to communicate with the four screw holes SCH described with reference to FIG. 3A may be formed through the second end portion 445. Four among the screws SCW, which penetrate the other end portion of one of the two intermediate base portions 143 shown in FIG. 2, may be inserted into the four through holes formed through the second end portion 445 and screwed into the four screw holes SCH, respectively.

Similarly to the rod member 441, the rod member 442 may include a first end portion 444 and a second end portion 445. The rod member 442 may further include an intermediate portion 446. The intermediate portion 446 may extend between the first end portion 444 and the second end portion 445 in the extending direction of the first rotation axis RAX (see FIG. 2). The intermediate portion 446 of the rod member 442 may be equal in thickness to the intermediate portion 443 of the rod member 441. The intermediate portion 446 of the rod member 442 may be longer than the intermediate portion 443 of the rod member 441.

In a case where the rod member 441 is mounted to the work positioner 100 as each of the two intermediate base portions 143, when a distance between the first support axis FSX and the second support axis SSX is too short with respect to a workpiece (not shown), it may also be possible that a worker separates the rod member 441 from the first base portion 141 and the second base portion 142 by unscrewing the plurality of screws SCW. It may also be possible that the worker then increases the distance between the first base portion 141 and the second base portion 142 so that the distance is suitable for the workpiece. It may also be possible that, finally, the worker connects the rod member 442 to the first base portion 141 and the second base portion 142.

In a case where the rod member 442 is mounted to the work positioner 100 as each of the two intermediate base portions 143, when a distance between the first support axis FSX and the second support axis SSX is too long with respect to a workpiece (not shown), it may also be possible that a worker separates the rod member 442 from the first base portion 141 and the second base portion 142 by unscrewing the plurality of screws SCW. It may also be possible that the worker then decreases the distance between the first base portion 141 and the second base portion 142 so that the distance is suitable for the workpiece. It may also be possible that, finally, the worker connects the rod member 441 to the first base portion 141 and the second base portion 142.

(Rail) It may also be possible that a first support column and/or a second support column are directly secured to a base. In this case, the first support column and/or the second support column may be supported to the base. When, however, the first support column and/or the second support column are provided to stand from a rail installed on the base, a worker can adjust a distance between the first support column and the second support column by causing the first support column and/or the second support column to move along the rail. In this case, without the need to prepare multiple intermediate base portions different in length, the worker can adjust a distance between the first support column and the second support column so that the distance is suitable for a size and a shape of a workpiece. Also in this case, the first support column and/or the second support column may be supported to the base.

As shown in FIG. 2, the work positioner 100 may be provided with four rails 171, 172, 173, and 174. The rails 171 and 172 may be secured to the first base portion 141. The rails 173 and 174 may be secured to the second base portion 142.

Rail grooves 175, 176, 177, and 178 may be formed in the rails 171, 172, 173, and 174, respectively. Each of the rail grooves 175, 176, 177, and 178 may extend substantially parallel to the first rotation axis RAX.

One of the first support column pieces 151 (see FIG. 1) that forms a lower end of the first support column 150 may be secured to the rails 171 and 172 with a bolt (not shown) and a nut NT1 (see FIG. 1). A worker may loosen the nut NT1 so that the first support column 150 can move along the rail grooves 175 and 176. After the first support column 150 has reached an appropriate position, the worker may tighten the nut NT1 so that the first support column 150 can be secured to the rails 171 and 172.

One of the second support column pieces 161 (see FIG. 1) that forms a lower end of the second support column 160 may be secured to the rails 173 and 174 with a bolt (not shown) and a nut NT2 (see FIG. 1). A worker may loosen the nut NT2 so that the second support column 160 can move along the rail grooves 177 and 178. After the second support column 160 has reached an appropriate position, the worker may tighten the nut NT2 so that the second support column 160 can be secured to the rails 173 and 174.

Figure 5:
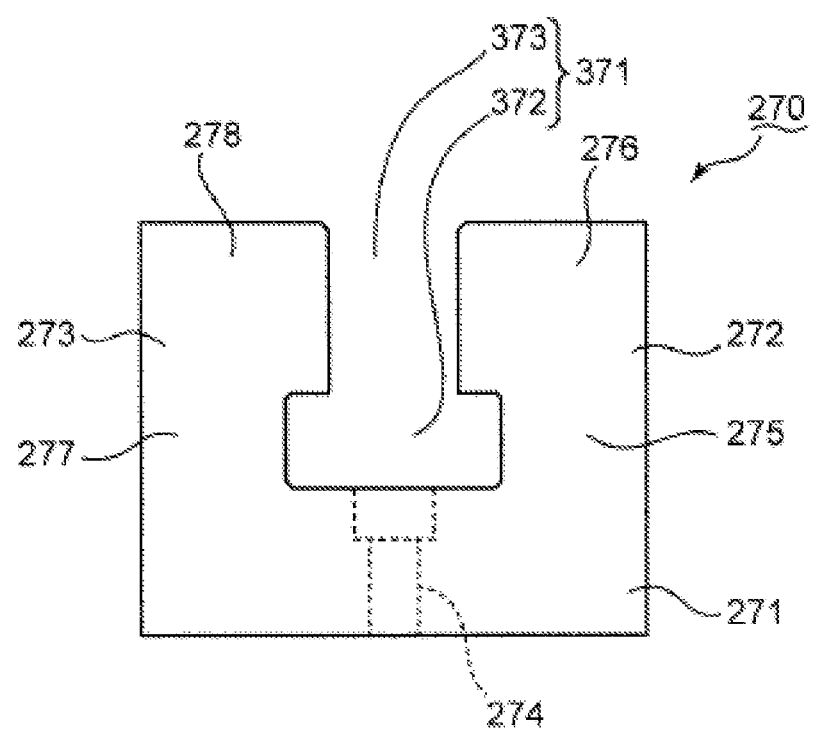
FIG. 5 is a schematic side view of a rail used in the work positioner shown in FIG. 1.

FIG. 5 is a schematic side view of a rail 270. The rail 270 may be usable as each of the rails 171, 172, 173, and 174 described with reference to FIG. 2. A description related to the rail 270 may be applied to each of the rails 171, 172, 173, and 174. With reference to FIG. 1, FIG. 3A, and FIG. 5, a description is given of the rail 270.

The rail 270 may include a bottom plate portion 271 and two side wall portions 272 and 273. A lower surface of the bottom plate portion 271 may be brought into contact with an upper surface of the first base portion 141 or the second base portion 142. A plurality of bolt holes 274 (FIG. 5 shows one bolt hole 274) may be formed in the bottom plate portion 271. The plurality of bolt holes 274 may be formed at substantially regular intervals in the extending direction of the first rotation axis RAX (see FIG. 2). A plurality of bolts BLT (see FIG. 2) may be inserted into the plurality of bolt holes 274 and screwed into a plurality of screw holes SCI (see FIG. 3A) formed in the first base portion 141 or the second base portion 142, respectively.

The side wall portions 272 and 273 may be provided to stand from the bottom plate portion 271. The side wall portion 272 may be away from the side wall portion 273 in a direction substantially orthogonal to the extending direction of the first rotation axis RAX. As a result, there may be formed a rail groove 371 surrounded by the bottom plate portion 271 and the side wall portions 272 and 273. The rail groove 371 may be open upward. The rail groove 371 may correspond to each of the rail grooves 175, 176, 177, and 178.

The side wall portion 272 may include a thin wall portion 275 and a thick wall portion 276. The thin wall portion 275 may be thinner than the thick wall portion 276. The thin wall portion 275 may be positioned between the thick wall portion 276 and the bottom plate portion 271. The side wall portion 273 may include a thin wall portion 277 and a thick wall portion 278. The thin wall portion 277 may be thinner than the thick wall portion 278. The thin wall portion 277 may be positioned between the thick wall portion 278 and the bottom plate portion 271.

The rail groove 371 may include a thick groove portion 372 and a thin groove portion 373. The thick groove portion 372 may be thicker than the thin groove portion 373. The thick groove portion 372 may be formed between the thin wall portions 275 and 277. The thin groove portion 373 may be formed between the thick wall portions 276 and 278. A head portion of a bolt (not shown) for securing the one of the first support column pieces 151 that forms the lower end of the first support column 150 or the one of the second support column pieces 161 that forms the lower end of the second support column 160 (see FIG. 1) may be disposed in the thick groove portion 372. A body portion of the bolt, which is thinner than the head portion, may penetrate the thin groove portion 373 and protrude upward from the rail 270. Each of the nuts NT1 and NT2 shown in FIG. 1 may be screwed with a screw portion formed on the body portion of the bolt.

(Support Column Piece) As mentioned above, first support column pieces and second support column pieces may be formed based on a common drawing. A design engineer of a work positioner can impart any of various shapes to a support column piece used as each of the first support column pieces and the second support column pieces. A description is given of an exemplary support column piece.

Figure 6A:
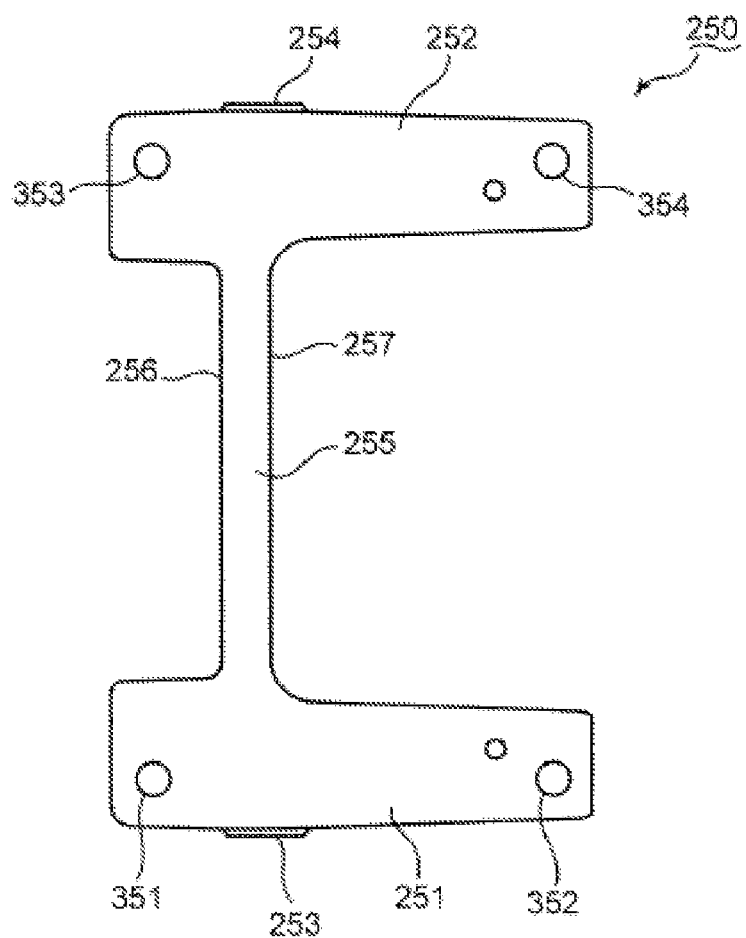
FIG. 6A is a schematic plan view of a support column piece used in the work positioner shown in FIG. 1.
Figure 6B:
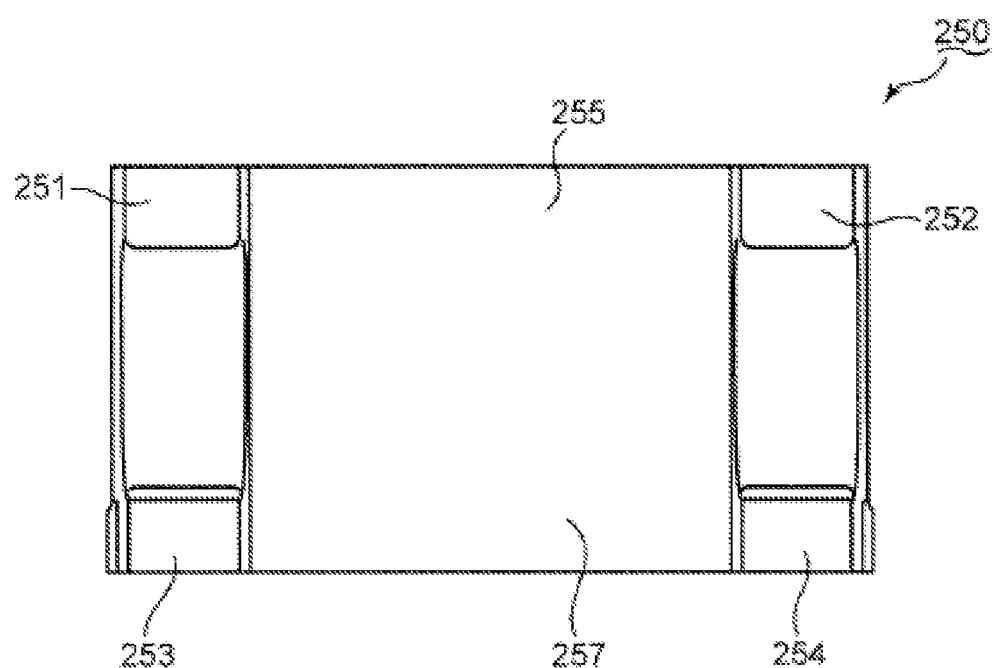
FIG. 6B is a schematic plan view of the support column piece shown in FIG. 6A.

FIG. 6A is a schematic plan view of a support column piece 250. FIG. 6B is a schematic side view of the support column piece 250. The support column piece 250 may be usable as each of the first support column pieces 151 (see FIG. 1) and the second support column pieces 161 (see FIG. 1). A description related to the support column piece 250 may be applied to each of the first support column pieces 151 and the second support column pieces 161. With reference to FIG. 1, FIG. 2, FIG. 6A, and FIG. 6B, a description is given of the support column piece 250.

The support column piece 250 may include four connection arms 251, 252, 253, and 254 and a connection wall 255 connecting the connection arms 251, 252, 253, and 254 to each other. When the support column piece 250 is used as each of the first support column pieces 151 or each of the second support column pieces 161, the arm 251 may be disposed above the arm 253. When the support column piece 250 is used as each of the first support column pieces 151 or each of the second support column pieces 161, the arm 252 may be disposed above the arm 254. When the support column piece 250 is used as each of the first support column pieces 151 or each of the second support column pieces 161, the arm 251 and the arm 252 may be arranged in a row in a direction orthogonal to the first rotation axis RAX. When the support column piece 250 is used as each of the first support column pieces 151 or each of the second support column pieces 161, the arm 253 and the arm 254 may be arranged in a row in a direction orthogonal to the first rotation axis RAX. The connection wall 255 may include a first surface 256 and a second surface 257 on an opposite side to the first surface 256. When the support column piece 250 is used as each of the first support column pieces 151, the first surface 256 may be opposed to the work retaining portion 110 or the second support column 160. When the support column piece 250 is used as each of the second support column pieces 161, the first surface 256 may be opposed to the work retaining portion 110 or the first support column 150. Each of the connection arms 251, 252, 253, and 254 may protrude from the first surface 256 and from the second surface 257 in the extending direction of the first rotation axis RAX (see FIG. 1). An amount by which each of the connection arms 251, 252, 253, and 254 protrudes from the first surface 256 may be smaller than an amount by which the each of the connection arms 251, 252, 253, and 254 protrudes from the second surface 257.

As shown in FIG. 6A, vertically extending screw holes 351 and 352 may be formed at both end portions of the connection arm 251, respectively. Vertically extending screw holes 353 and 354 may be formed at both end portions of the connection arm 252, respectively. When the support column piece 250 is used as an uppermost one of the first support column pieces 151 of the first support column 150, the screw holes 351, 352, 353, and 354 may be used to secure the flange 123 (see FIG. 1) of the drive portion 120 (see FIG. 1). In other cases, the screw holes 351, 352, 353, and 354 may be used to secure one of the first support column pieces 151 that is disposed above the support column piece 250. When the support column piece 250 is used as an uppermost one of the second support column pieces 161 of the second support column 160, the screw holes 351, 352, 353, and 354 may be used to secure the flange 132 (see FIG. 1) of the bearing portion 130 (see FIG. 1). In other cases, the screw holes 351, 352, 353, and 354 may be used to secure one of the second support column pieces 161 that is disposed above the support column piece 250.

Two through holes (not shown) formed substantially coaxially with the screw holes 351 and 352 may be formed at both end portions of the connection arm 253, respectively. Two through holes (not shown) formed substantially coaxially with the screw holes 353 and 354 may be formed at both end portions of the connection arm 254, respectively. When the support column piece 250 is used as a lowermost one of the first support column pieces 151 of the first support column 150, the through holes may be used to connect to the rails 171 and 172. In other cases, the through holes may be used for connection between the support column piece 250 and one of the first support column pieces 151 that is disposed below the support column piece 250. When the support column piece 250 is used as a lowermost one of the second support column pieces 161 of the second support column 160, the through holes may be used to connect to the rails 173 and 174. In other cases, the through holes may be used for connection between the support column piece 250 and one of the second support column pieces 161 that is disposed below the support column piece 250.

(Adjustment Due to Change in Weight of Workpiece) When an extremely heavy workpiece is loaded on the work retaining portion 110, a worker may need to replace the speed reducer 122 with another speed reducer (not shown) that can output a rotational force larger than that of the speed reducer 122. In many cases, a speed reducer that can output a large rotational force may be larger in size than the speed reducer 122. Thus, the flange 123 may also need to be replaced with another flange (not shown) adapted to such a large-sized speed reducer. When such a flange, which is used together with a large-sized speed reducer, is designed so that a rotation center of the large-sized speed reducer used in place of the speed reducer 122 is substantially aligned with the first rotation axis RAX of the speed reducer 122, a worker can create a new type of work positioner suitable for a heavy workpiece with almost no need for replacement of components. Alternatively, it may also be possible to selectively use a pillow block used as the bearing portion 130 so as to be adapted to a positional change of a rotation center caused by replacement of the speed reducer 122 with a large-sized speed reducer. Also in this case, a worker can create a new type of work positioner suitable for a heavy workpiece with almost no need for replacement of components. Thus, a work positioner designed based on the design principle described in relation to the first embodiment not only can be used for workpieces varying in shape and size but also can be used for workpieces varying in weight.

While the work positioner 100 of this embodiment may be provided with the rails 171, 172, 173, and 174, it may also be possible to omit the rails 171, 172, 173, and 174. That is, it may also be possible that the first support column 150 and the second support column 160 are directly provided to stand on the base 140 or indirectly provided to stand on the base 140.

Second Embodiment

Based on the design principle described in relation to the first embodiment, a design engineer can design a work positioner capable of retaining a plurality of workpieces. A second embodiment describes an exemplary work positioner designed to be capable of retaining a plurality of workpieces.

Figure 7:
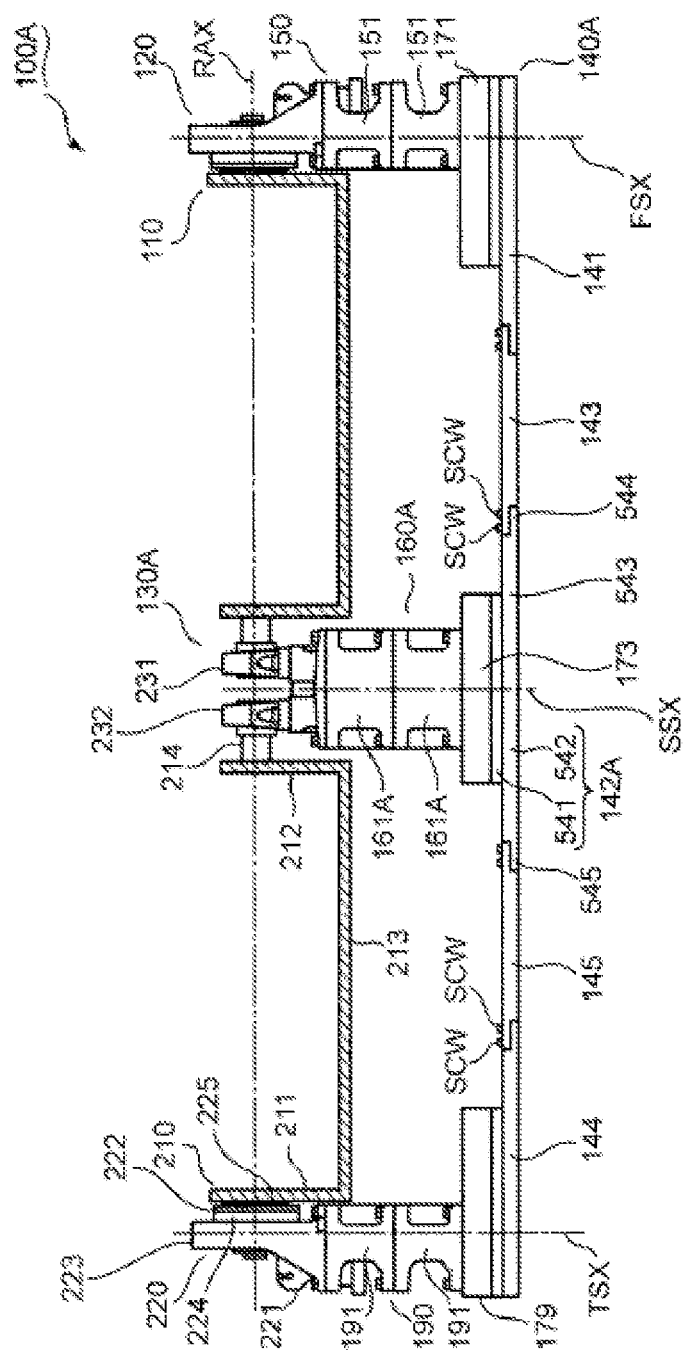
FIG. 7 is a schematic front view of a work positioner according to a second embodiment.

FIG. 7 is a schematic front view of a work positioner 100A of the second embodiment. With reference to FIG. 1, FIG. 3A, and FIG. 7, a description is given of the work positioner 100A. The same elements as those of the first embodiment are indicated by the same reference characters as in the first embodiment. The description of the first embodiment may be applied to these elements.

Similarly to the first embodiment, the work positioner 100A may be provided with a work retaining portion 110, a drive portion 120, and a first support column 150. The description of the first embodiment may be applied to these elements.

The work positioner 100A may be provided further with a bearing portion 130A, a base 140A, a second support column 160A, a second work retaining portion 210, a drive portion 220, and a third support column 190. The second work retaining portion 210 may be used to retain a workpiece (not shown) different from a workpieces loaded on the work retaining portion 110. The second work retaining portion 210 may be disposed in a space between the drive portion 220 (and the third support column 190) and the bearing portion 130A (and the second support column 160A). In this embodiment, a workpiece retained by the second work retaining portion 210 may be an example of a second workpiece.

The second work retaining portion 210 may include a first side wall 211, a second side wall 212, a retaining plate 213, and a shaft 214. The first side wall 211 and the second side wall 212 may be substantially orthogonal to a first rotation axis RAX. The first side wall 211 may be secured to the drive portion 220. The second side wall 212 may be positioned adjacently to the bearing portion 130A and the second support column 160A. The retaining plate 213 may extend between a lower end of the first side wall 211 and a lower end of the second side wall 212 so as to be substantially parallel to the first rotation axis RAX. A workpiece may be placed and secured on the retaining plate 213. The shaft 214 may extend from the second side wall 212 toward the bearing portion 130A along the first rotation axis RAX. It may also be possible that the second work retaining portion 210 has a different structure allowing a workpiece to be retained (for example, a chuck structure). A principle of this embodiment is not limited to a particular structure of the second work retaining portion 210.

The drive portion 220 may include a motor 221, a speed reducer 222, and a flange 223. The motor 221 may be mounted to the flange 223. The motor 221 may have a rotary shaft (not shown) connected to the speed reducer 222. The motor 221 may generate a drive force for driving the second work retaining portion 210. The drive force may be outputted in the form of rotation of the rotary shaft of the motor 221.

The speed reducer 222 may include an outer cylinder 224 and a carrier 225. The outer cylinder 224 may have a substantially cylindrical shape. A major part of the carrier 225 may be housed in the outer cylinder 224. An end surface of the carrier 225 may be exposed from the outer cylinder 224. The end surface of the carrier 225 may be secured to the first side wall 211 of the second work retaining portion 210.

The speed reducer 222 may include a gear mechanism (not shown) constructed within the outer cylinder 224. The rotary shaft of the motor 221 may be connected to the gear mechanism of the speed reducer 222. When the rotary shaft of the motor 221 rotates, a drive force may be increased in accordance with a speed reduction ratio determined by the gear mechanism and outputted in the form of rotation of the carrier 225 having a rotation speed lower than that of the rotary shaft of the motor 221. The outer cylinder 224 may be secured to the flange 223, and thus during rotation of the carrier 225, the outer cylinder 224 may remain stationary.

The flange 223 may encircle the outer cylinder 224. The outer cylinder 224 may be secured by the flange 223. The flange 223 may retain the outer cylinder 224 so that a rotation center of the carrier 225 is substantially aligned with the first rotation axis RAX. Thus, a drive force generated by the motor 221 may be outputted in the form of rotation of the carrier 225 about the rotation axis RAX to the second work retaining portion 210. As a result, the second work retaining portion 210 may perform an angular movement about the first rotation axis RAX. A rotational force outputted from the carrier 225 may be an example of a second rotational force. Rotation of the second work retaining portion 210 about the first rotation axis RAX may be an example of a second angular movement.

The bearing portion 130A may include pillow blocks 231 and 232. It may also be possible that each of the pillow blocks 231 and 232 is structurally the same as the bearing portion 130 described with reference to FIG. 1. Thus, the description of the bearing portion 130 may be applied to each of the pillow blocks 231 and 232.

A shaft 114 of the work retaining portion 110 may be fitted into the pillow block 231. The shaft 214 of the second work retaining portion 210 may be fitted into the pillow block 232. Thus, the bearing portion 130A can support the work retaining portions 110 and 210 in cooperation with the drive portions 120 and 220.

Similarly to the first embodiment, the base 140A may include a first base portion 141 and two intermediate base portions 143 (FIG. 7 shows one of the two intermediate base portions 143). The description of the first embodiment may be applied to these elements.

The base 140A may include a second base portion 142A, a third base portion 144, and two intermediate base portions 145 (FIG. 7 shows one of the two intermediate base portions 145). FIG. 7 shows a third support axis TSX depicted at a position corresponding to the drive portion 220. The third support axis TSX, extending from the base 140, may be orthogonal to the first rotation axis RAX in the drive portion 220. A second support axis SSX may be positioned between a first support axis FSX and the third support axis TSX. The third support axis TSX may be parallel to the first support axis FSX and the second support axis SSX. The second base portion 142A may be disposed at a position intersecting the second support axis SSX. The third base portion 144 may be disposed at a position intersecting the third support axis TSX.

The base member 240 described with reference to FIG. 3A may be usable as the third base portion 144. Thus, the description related to the base member 240 may be applied to the third base portion 144. Each of the rod members 441 and 442 described with reference to FIG. 4 may be usable as each of the intermediate base portions 145. Thus, the description related to the rod members 441 and 442 may be applied to the intermediate base portions 145.

Figure 8:
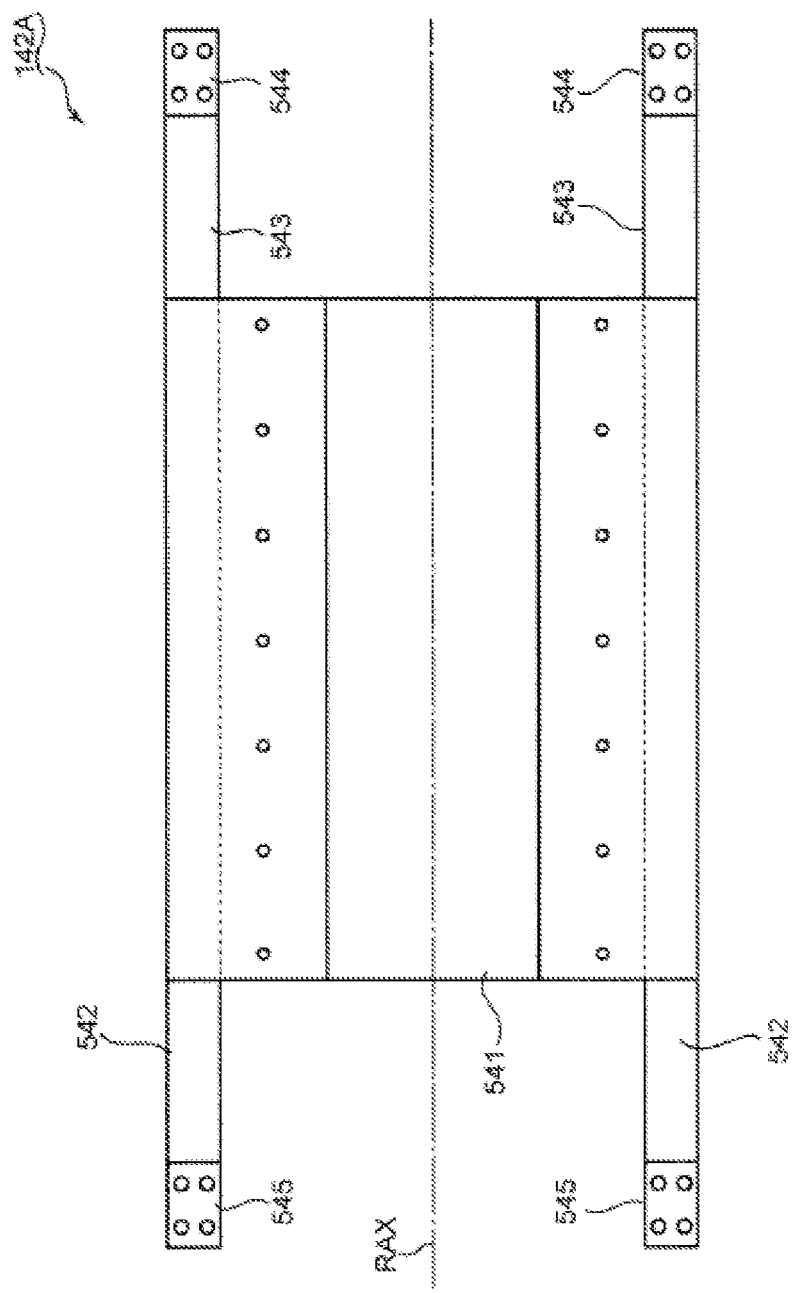
FIG. 8 is a schematic plan view of a second base portion in the work positioner shown in FIG. 7.

FIG. 8 is a schematic plan view of the second base portion 142A. With reference to FIG. 2, FIG. 3A, and FIG. 5 to FIG. 8, a further description is given of the work positioner 100A.

The second base portion 142A may include a base plate 541 and two arms 542. It may also be possible that the base plate 541 is a rectangular plate member longer in an extending direction of the first rotation axis RAX than the base plate 241 of the base member 240 described with reference to FIG. 3A. It may also be possible that the base plate 541 has a width substantially equal to that of the base plate 241 in a direction orthogonal to the extending direction of the first rotation axis RAX. The two arms 542 may extend in the extending direction of the first rotation axis RAX and protrude from the base plate 541 toward the first base portion 141 and toward the third base portion 144.

In a first rotation axis RAX direction, each of the two arms 542 may be extended out from both end portions of the base plate 541. Each of the two arms 542 may include a support portion 543 and two end portions 544 and 545. The end portions 544 and 545 may be thinner than the support portion 543. The end portion 544 may protrude from one end portion of the support portion 543 toward the first base portion 141. The end portion 545 may protrude from the other end portion of the support portion 543 toward the third base portion 144. One end portion of each of the intermediate base portions 143 may be overlaid on the end portion 544 and connected thereto with a plurality of screws SCW (see FIG. 7). One end portion of each of the intermediate base portions 145 may be overlaid on the end portion 545 and connected thereto with a plurality of screws SCW.

A connection structure between the arms 542 and the intermediate base portions 143 and 145 may be the same as that between the arms 242 and 243 of the base member 240 (see FIG. 3A) and each of the rod members 441 and 442 (see FIG. 4). Thus, the description related to the connection structure between the arms 242 and 243 of the base member 240 and each of the rod members 441 and 442 may be applied to the connection structure between the arms 542 and the intermediate base portions 143 and 145.

The work positioner 100A may be provided further with rails 171, 172, 173, and 174 (see FIG. 2) (FIG. 7 shows the rails 171 and 173 among these rails). Similarly to the first embodiment, the rails 171 and 172 may be installed on the first base portion 141. The rails 173 and 174 may be aligned with the rails 171 and 172 in the extending direction of the first rotation axis RAX, respectively. It may also be possible that the rails 173 and 174 are installed on the base plate 541 so as to be divided into two parts by a virtual plane including the second support axis SSX and orthogonal to the first rotation axis RAX.

The work positioner 100A may be provided further with two rails 179 (FIG. 7 shows one of the two rails 179). The two rails 179 may be installed on the third base portion 144. The two rails 179 may be in a mirror-image positional relationship with the rails 171 and 172 relative to the virtual plane including the second support axis SSX and orthogonal to the first rotation axis RAX. The rail 270 described with reference to FIG. 5 may be usable as each of the two rails 179. Thus, the description related to the rail 270 may be applied to each of the two rails 179.

The third support column 190 shown in FIG. 7 may include two third support column pieces 191. On the rails 179, the third support column pieces 191 may be stacked along the third support axis TSX. One of the two third support column pieces 191 may be secured to the two rails 179. The other of the two third support column pieces 191 may be interposed between the drive portion 220 and the one of the two third support column pieces 191 that is secured to the two rails 179. As a result, the two third support column pieces 191 can extend along the third support axis TSX to form the third support column 190 supporting the drive portion 220. The support column piece 250 described with reference to FIG. 6A and FIG. 6B may be usable as each of the two third support column pieces 191. Thus, the description related to the support column piece 250 may be applied to each of the two third support column pieces 191.

It may also be possible that a worker determines a distance between the first rotation axis RAX and the base 140A so that the distance is adapted to a shape and a size of a workpiece retained in each of the work retaining portions 110 and 210. The worker can determine how many third support column pieces 191 are to be used to form the third support column 190 so that the distance thus determined is attained. Thus, the principle of this embodiment may not be limited in any way by how many third support column pieces 191 are included in the third support column 190.

The second support column 160A shown in FIG. 7 may include two second support column pieces 161A. On the rails 173 and 174, the two second support column pieces 161A may be stacked along the second support axis SSX. An upper surface of each of the two second support column pieces 161A may be longer than a lower surface of each of the two pillow blocks 231 and 232 in the extending direction of the first rotation axis RAX. Thus, the second support column 160A can stably support the bearing portion 130A. Unlike in the first embodiment, it may also be possible that the second support column pieces 161A are longer than the first support column pieces 151 in the extending direction of the first rotation axis RAX. When the two pillow blocks 231 and 232 are stably supported, similarly to the first support column pieces 151, it may also be possible that the support column piece 250 described with reference to FIG. 6A and FIG. 6B is used as each of the second support column pieces 161A.

Similarly to the third support column 190, a worker can determine how many first support column pieces 151 are to be included in the first support column 150 and how many second support column pieces 161A are to be included in the second support column 160A so that the thus determined number of the first support column pieces 151 and the thus determined number of the second support column pieces 161A are adapted to a distance between the first rotation axis RAX and the base 140. Thus, the principle of this embodiment may not be limited in any way by how many first support column pieces 151 are included in the first support column 150 and how many second support column pieces 161A are included in the second support column 160A.

Third Embodiment

The work positioner described as the second embodiment may have two work retaining portions each configured to perform an angular movement about a common rotation axis. Alternatively, it may also be possible that a work positioner has two work retaining portions configured to perform angular movements about two rotation axes parallel to each other, respectively. A third embodiment describes an exemplary work positioner having two work retaining portions configured to perform angular movements about two rotation axes parallel to each other, respectively.

Figure 9:
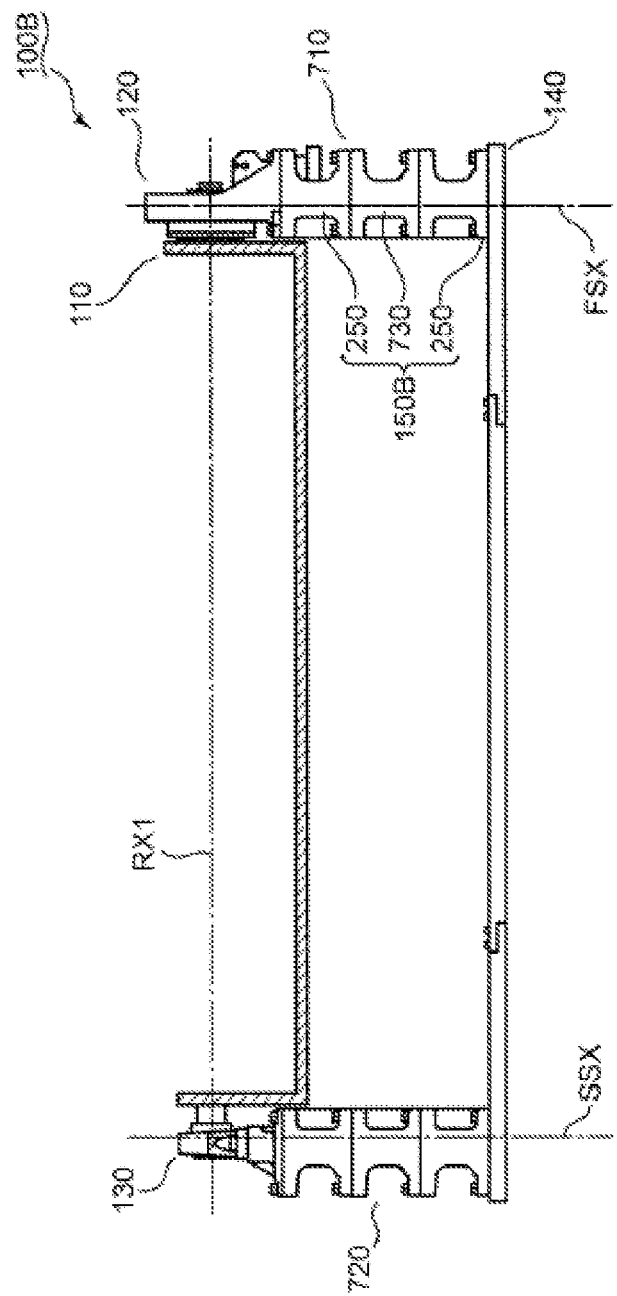
FIG. 9 is a schematic sectional view of a work positioner according to a third embodiment.

FIG. 9 is a schematic sectional view of a work positioner 100B of the third embodiment. With reference to FIG. 1 and FIG. 9, a description is given of the work positioner 100B. The same elements as those of the foregoing embodiments are indicated by the same reference characters as in the foregoing embodiments. The descriptions of the foregoing embodiments may be applied to these elements.

Similarly to the first embodiment, the work positioner 100B may be provided with a base 140. The description of the first embodiment may be applied to the base 140.

The work positioner 100B may be provided with two work retaining portions (a first work retaining portion and a second work retaining portion) 110, two drive portions (a first drive portion and a second drive portion) 120, and two bearing portions (a first bearing portion and a second bearing portion) 130. FIG. 9 shows one of the two work retaining portions 110, one of the two drive portions 120, and one of the two bearing portions 130. Each of the two work retaining portions 110 may be the same as the work retaining portion 110 described with reference to FIG. 1. Each of the two drive portions 120 may be the same as the drive portion 120 described with reference to FIG. 1. Each of the two bearing portions 130 may be the same as the bearing portion 130 described with reference to FIG. 1. Thus, the description of the first embodiment may be applied to these elements. Regarding this embodiment, one of the two work retaining portions 110 may be an example of a first work retaining portion. The other of the two work retaining portions 110 may be an example of a second work retaining portion. One of the two drive portions 120 may be an example of a first drive portion. The other of the two drive portions 120 may be an example of a second drive portion.

The work positioner 100B may be provided further with a first support member 710 and a second support member 720. On a first support axis FSX, the first support member 710 may be directly secured to the base 140. On a second support axis SSX, the second support member 720 may be directly secured to the base 140. The first support member 710 may support the two drive portions 120. The second support member 720 may support the two bearing portions 130. The second support member 720 may be structurally the same as the first support member 710. Thus, a description related to the first support member 710 may be applied to the second support member 720. It may also be possible that, instead of being directly secured to the base 140, the first support member 710 and the second support member 720 are secured to rails and supported to the base 140 via the rails.

Figure 10:
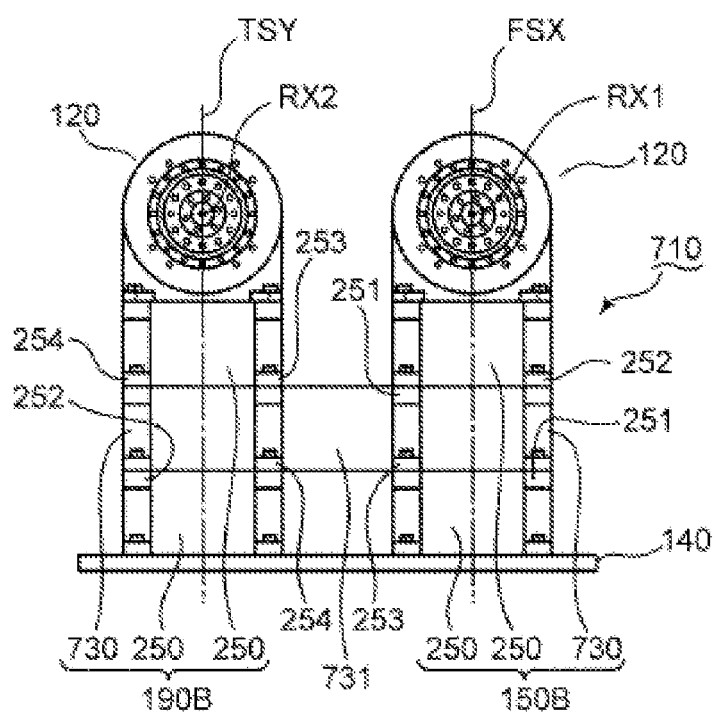
FIG. 10 is a side view of a first support member in the work positioner shown in FIG. 9.

FIG. 10 is a side view of the first support member 710. With reference to FIG. 9 and FIG. 10, a description is given of the first support member 710.

FIG. 10 shows two rotation axes RX1 and RX2. The rotation axis RX1 may be parallel to the rotation axis RX2. One of the two drive portions 120 may output a rotational force about the first rotation axis RX1. The other of the two drive portions 120 may output a rotational force about the second rotation axis RX2. A rotational force about the first rotation axis RX1 may be an example of a first rotational force. A rotational force about the second rotation axis RX2 may be an example of a second rotational force. The one of the drive portions 120 that outputs a rotational force about the first rotation axis RX1 may be an example of a first drive portion. The other of the drive portions 120 that outputs a rotational force about the second rotation axis RX2 may be an example of a second drive portion.

FIG. 10 shows the first support axis FSX and a third support axis TSY. The first support axis FSX may extend upward from the base 140 so as to be orthogonal to the first rotation axis RX1. The third support axis TSY may extend upward from the base 140 so as to be orthogonal to the second rotation axis RX2. The first support axis FSX and the third support axis TSY may be aligned with each other in an extending direction of a straight line orthogonal to the rotation axes RX1 and RX2 and the first support axis FSX and the third support axis TSY.

The first support member 710 may be composed of four support column pieces 250, one spacer piece (a first spacer piece) 731, and two I-shaped pieces (a second spacer piece) 730. Two among the four support column pieces 250 may be arranged in a row at a predetermined distance from each other along the first support axis FSX. In FIG. 10, these two support column pieces 250 may be positioned in first and third tiers from the bottom. One of the two I-shaped pieces 730 may be disposed between these two support column pieces 250. That is, in FIG. 10, the one of the I-shaped pieces 730 may be positioned in a second tier from the bottom. These two support column pieces 250 and the one I-shaped piece 730 may collaboratively constitute a first support column 150B. The first support column 150B may support the one of the drive portions 120 that outputs a rotational force about the first rotation axis RX1.

The other two among the four support column pieces 250 may be arranged in a row at a predetermined distance from each other along the third support axis TSY. In FIG. 10, these two support column pieces 250 may be positioned in the first and third tiers from the bottom. The other of the two I-shaped pieces 730 may be disposed between these two support column pieces 250. That is, in FIG. 10, the other of the I-shaped pieces 730 may be positioned in the second tier from the bottom. These two support column pieces 250 and the one I-shaped piece 730 may collaboratively constitute a third support column 190B. The third support column 190B may support the other of the drive portions 120 that outputs a rotational force about the second rotation axis RX2. In this embodiment, the two support column pieces 250 arranged in a row along the third support axis TSY may be an example of a plurality of third support column pieces.

The spacer piece 731 may be disposed between the first support column 150B and the third support column 190B. In other words, the spacer piece 731 may be provided to extend between an intermediate region of the first support column 150B and an intermediate region of the third support column 190B. In FIG. 10, the spacer piece 731 may be positioned in the second tier from the bottom. Thus, there may be a space between the spacer piece 731 and the base 140. The spacer piece 731 may be equal in shape and size to each of the support column pieces 250. Thus, the description related to each of the support column pieces 250 may be applied to the spacer piece 731. The spacer piece 731 may have a height equal to that of the I-shaped pieces 730.

The spacer piece 731 may be partly inserted in a gap between the two support column pieces 250 forming the first support column 150B. That is, a pair of the connection arms 251 and 253 of the spacer piece 731 disposed between the first support column 150B and the third support column 190B may be interposed between the two support column pieces 250 forming the first support column 150B. Regarding this embodiment, the connection arms 251 and 253 of the spacer piece 731 and a part of the connection wall 255 thereof, which is positioned between the connection arms 251 and 253, may be an example of a first region. The gap between the two support column pieces 250 forming the first support column 150B may be an example of a first gap. A gap may be formed between the spacer piece 731 and each of the I-shaped pieces 730.

The spacer piece 731 may be partly inserted in a gap between the two support column pieces 250 forming the third support column 190B. That is, a pair of the connection arms 252 and 254 of the spacer piece 731 may be interposed between the two support column pieces 250 forming the third support column 190B. Regarding this embodiment, the connection arms 252 and 254 of the spacer piece 731 and a part of the connection wall 255 thereof, which is positioned between the connection arms 252 and 254, may be an example of a second region. The gap between the two support column pieces 250 forming the third support column 190B may be an example of a second gap. A gap may be formed between the spacer piece 731 and each of the I-shaped pieces 730.

The two I-shaped pieces 730 may have a substantially I-shape in front view (see FIG. 9). One of the I-shaped pieces 730 that forms the first support column 150B may be interposed between the connection arm 253 of an upper one of the support column pieces 250 and the connection arm 251 of a lower one of the support column pieces 250. As a result, the upper one of the support column pieces 250 that forms the first support column 150B may be stably supported above the lower one of the support column pieces 250. One of the I-shaped pieces 730 that forms the third support column 190B may be interposed between the connection arm 254 of an upper one of the support column pieces 250 and the connection arm 252 of a lower one of the support column pieces 250. As a result, the upper one of the support column pieces 250 that forms the third support column 190B may be stably supported above the lower one of the support column pieces 250.

The first support member 710 may be composed of the two I-shaped pieces 730 equal in shape and size, the four support column pieces 250 equal in shape and size, and the spacer piece 731 equal in shape and size to each of the support column pieces 250. Thus, the first support member 710 may be formed by using a reduced number of types of components.

As shown in FIG. 10, the four support column pieces 250 and the spacer piece 731 may form a checkered pattern. Thus, the first support member 710 may be formed by using a reduced number of components.

It may also be possible that a worker uses an additional support column piece(s) 250, an additional spacer piece(s) 731, and an additional I-shaped piece(s) 730 to set one of the rotation axes RX1 and RX2 to be higher in level than the other of the rotation axes RX1 and RX2. It may also be possible that a worker forms a horizontally expanded checkered pattern by using an additional support column piece(s) 250, an additional spacer piece(s) 731, and an additional I-shaped piece(s) 730. In this case, the worker can add a drive portion(s) and a work retaining portion(s) and thus can provide a work positioner capable of retaining more than two workpieces.

The design principles described in relation to the foregoing various embodiments may be applicable to various types of work positioners. It may also be possible that some of the various features described in relation to any one of the foregoing various embodiments are applied to the work positioner described in relation to another one of the embodiments.

Outlines of the foregoing embodiments will now be described.

(1) A work positioner according to the embodiment of the present invention may be provided with a first work retaining portion for retaining a first workpiece, a first drive portion configured to output a first rotational force about a first rotation axis and impart a first angular movement about the first rotation axis to the first work retaining portion, a bearing portion supporting the first work retaining portion in cooperation with the first drive portion, a base arranged away from the first rotation axis, a first support column extending along a first support axis extending from the base toward the first rotation axis, the first support column supporting the first drive portion, and a second support column extending along a second support axis extending between the base and the first rotation axis so as to be parallel to the first support axis, the second support column supporting the bearing portion. The first support column may include a plurality of first support column pieces arranged in a row along the first support axis.

According to the above-described configuration, the first drive portion may output the first rotational force about the predetermined first rotation axis and impart the first angular movement about the first rotation axis to the first work retaining portion, and thus the first workpiece may be set in an appropriate position and an appropriate posture. The bearing portion may support the first work retaining portion in cooperation with the first drive portion, and thus the first work retaining portion can stably rotate about the first rotation axis. Thus, processing accuracy with respect to the first workpiece may be maintained at a high level.

The first support column may extend along the first support axis extending from the base toward the first rotation axis to support the first drive portion, and the second support column may extend along the second support axis extending between the base and the first rotation axis so as to be parallel to the first support axis to support the bearing portion. Thus, the first work retaining portion may be retained away by an appropriate distance from the base. The first support column may include the plurality of first support column pieces arranged in a row along the first support axis, and thus a worker who works using the work positioner can determine how many first support column pieces are to be used to form the first support column so that the first support column is suitable for a size and/or a shape of the first workpiece. Thus, the work positioner may be usable to retain the first workpieces varying in size.

(2) Regarding the above-described configuration, it may also be possible that the second support column includes a plurality of second support column pieces arranged in a row along the second support axis. It may also be possible that each of the plurality of second support column pieces is equal in shape and size to the plurality of first support column pieces.

According to the above-described configuration, the second support column may include the plurality of second support column pieces arranged in a row along the second support axis, and thus a worker can determine how many second support column pieces are to be used to form the second support column so that the second support column is suitable for a size and/or a shape of the first workpiece. Thus, the work positioner may be usable to retain the first workpieces varying in size. Each of the plurality of second support column pieces may be equal in shape and size to each of the plurality of first support column pieces, and thus a work positioner can be constructed by using a reduced number of types of components.

(3) Regarding the above-described configuration, it may also be possible that the base includes a first base portion disposed at a position intersecting the first support axis, a second base portion disposed at a position intersecting the second support axis, and an intermediate base portion disposed between the first base portion and the second base portion. It may also be possible that the intermediate base portion is separable from the first base portion and the second base portion.

According to the above-described configuration, the intermediate base portion disposed between the first base portion disposed at a position intersecting the first support axis and the second base portion disposed at a position intersecting the second support axis may be separable from the first base portion and the second base portion. Thus, when a distance between the first support column and the second support column is too long or too short, a worker may dismount the intermediate base portion from the first base portion and the second base portion so that a distance between the first base portion and the second base portion can be set to an appropriate value. After that, the worker can newly construct a base by mounting another intermediate base portion adapted to the thus adjusted distance between the first base portion and the second base portion to the first base portion and the second base portion. Thus, the worker can adjust the distance between the first support column and the second support column so that the distance is suitable for a length of a workpiece in the extending direction of the first rotation axis.

(4) Regarding the above-described configuration, it may also be possible that the intermediate base portion is formed of a rod member extending in the extending direction of the first rotation axis.

According to the above-described configuration, the intermediate base portion may be a rod member extending in the extending direction of the first rotation axis, and thus a worker can easily dismount the intermediate base portion from the first base portion and the second base portion and easily mount the intermediate base portion to the first base portion and the second base portion.

(5) Regarding the above-described configuration, it may also be possible that the work positioner is provided with a rail installed on the first base portion and extending parallel to the first rotation axis. It may also be possible that the first support column is positionally adjustable along the rail.

According to the above-described configuration, the first support column may be positionally adjustable along the rail, and thus, without the need to have multiple intermediate base portions different, for example, in length, a worker can set a distance between the first support column and the second support column to different values.

(6) Regarding the above-described configuration, it may also be possible that the work positioner is provided with a second work retaining portion for retaining a second workpiece, a second drive portion configured to output a second rotational force about the first rotation axis and impart a second angular movement about the first rotation axis to the second work retaining portion, and a third support column extending along a third support axis extending from the base toward the first rotation axis, the third support column supporting the second drive portion. It may also be possible that the bearing portion supports the second work retaining portion in cooperation with the second drive portion.

According to the above-described configuration, the work positioner may have the second work retaining portion, and thus a worker can mount not only the first workpiece but also the second workpiece to the work positioner. The second drive portion may output the second rotational force about the first rotation axis, and thus, similarly to the first work retaining portion, the second work retaining portion can perform an angular movement about the first rotation axis. The third support column may extend along the third support axis extending from the base toward the first rotation axis to support the second drive portion, and thus the second work retaining portion may be retained away by an appropriate distance from the base. Not only the first work retaining portion but also the second work retaining portion may be retained by the bearing portion, and thus a support structure for supporting the second work retaining portion may not occupy an extremely large area on the base.

(7) Regarding the above-described configuration, it may also be possible that the work positioner is provided with a second work retaining portion for retaining a second workpiece, a second drive portion configured to output a second rotational force about a second rotation axis parallel to the first rotation axis and impart a second angular movement about the second rotation axis to the second work retaining portion, a third support column including a plurality of third support column pieces arranged in a row along a third support axis extending from the base toward the second rotation axis, the third support column supporting the second drive portion, and a spacer piece disposed between the first support column and the third support column. It may also be possible that each of the spacer piece and the plurality of third support column pieces is equal in shape and size to the plurality of first support column pieces. It may also be possible that the spacer piece includes a first region inserted in a first gap formed between two first support column pieces and a second region inserted in a second gap formed between two third support column pieces. It may also be possible that the spacer piece, the two first support column pieces having the first region interposed therebetween and the two third support column pieces having the second region interposed therebetween are disposed to form a checkered pattern.

According to the above-described configuration, the work positioner may have the second work retaining portion, and thus a worker can mount not only the first workpiece but also the second workpiece to the work positioner. The second drive portion may output the second rotational force about the second rotation axis parallel to the first rotation axis, and thus the second workpiece may rotate adjacently to the first workpiece and be set in an appropriate position and an appropriate posture. The third support column may extend along the third support axis extending from the base toward the second rotation axis to support the second drive portion, and thus the second work retaining portion may be retained away by an appropriate distance from the base. Each of the spacer piece and the plurality of third support column pieces may be equal in shape and size to each of the plurality of first support column pieces, and thus a work positioner can be constructed by using a reduced number of types of components. The first region of the spacer piece may be inserted in the first gap formed between the two first support column pieces, while the second region of the spacer piece may be inserted in the second gap formed between the two third support column pieces, and thus the spacer piece, the two first support column pieces having the first region interposed therebetween, and the two third support column pieces having the second region interposed therebetween can form a checkered pattern. A worker can thus construct the first support column and the third support column by using a reduced number of components.

The above-mentioned work positioner can appropriately retain multiple workpieces different in shape and size.

What is claimed is:

1. A work positioner, comprising: a first work retainer configured for retaining a first workpiece; a first drive configured for outputting a first rotational force about a first rotation axis and imparting a first angular movement about the first rotation axis to the first work retainer; a bearing configured for supporting the first work retainer in cooperation with the first drive; a first base arranged away from the first rotation axis, the first base having a first end portion and a second end portion; a second base arranged away from the first rotation axis, the second base having a first end portion and a second end portion; an intermediate base extending between and removably connected to the second end portion of the first base and the first end portion of the second base, the intermediate base being separable from the second end portion of the first base and the first end portion of the second base; a first rail member disposed above and removably connected to the first base; a second rail member disposed above and removably connected to the second base; a first support column disposed above the first rail member, the first support column configured for supporting the first drive, the first support column being positionally adjustable along the first rail member; and a second support column disposed above the second rail member, the second support column configured for supporting the bearing, the second support column being positionally adjustable along the second rail member, wherein the first support column includes a plurality of first support column pieces stacked on top of one another on the first rail member, and wherein the second support column includes a plurality of second support column pieces stacked on top of one another on the second rail member.

2. The work positioner according to claim 1, wherein each of the plurality of second support column pieces is equal in shape and size to the plurality of first support column pieces.

3. The work positioner according to claim 1, wherein the intermediate base is formed of a rod member extending in an extending direction of the first rotation axis.

4. The work positioner according to claim 1, further comprising:
a second work retainer configured for retaining a second workpiece;
a second drive configured for outputting a second rotational force about the first rotation axis and imparting a second angular movement about the first rotation axis to the second work retainer; and
a third support column disposed on the base, the third support column configured for supporting the second drive,
wherein the bearing supports the second work retainer in cooperation with the second drive.

5. The work positioner according to claim 1, further comprising:
a second work retaining portion configured for retaining a second workpiece;
a second drive portion configured for outputting a second rotational force about a second rotation axis parallel to the first rotation axis and imparting a second angular movement about the second rotation axis to the second work retaining portion;
a third support column including a plurality of third support column pieces arranged in a row along a third support axis extending from the base toward the second rotation axis, the third support column configured for supporting the second drive portion; and
a spacer piece disposed between the first support column and the third support column,
wherein each of the spacer piece and the plurality of third support column pieces is equal in shape and size to the plurality of first support column pieces,
wherein the spacer piece includes a first region inserted in a first gap formed between two first support column pieces and a second region inserted in a second gap formed between two third support column pieces, and
wherein the spacer piece, the two first support column pieces having the first region interposed therebetween, and the two third support column pieces having the second region interposed therebetween are disposed to form a checkered pattern.

6. The work positioner according to claim 1, wherein a distance between the first rotation axis and the base is increased by adding a first support column piece to the first support column and adding a second support column piece to the second support column.

7. The work positioner according to claim 1, wherein a distance between the first rotation axis and the base is decreased by removing a first support column piece from the first support column and removing a second support column piece from the second support column.

8. The work positioner according to claim 1, wherein the first support column extends along a first support axis and the second support column extends along a second support axis, wherein a distance between the first support axis of the first support column and the second support axis of the second support column is configured to be adjusted by any combination of: replacing the intermediate member with a second intermediate member of a plurality of intermediate members, each of the plurality of intermediate members having a different length, the second intermediate member being removably connected to the second end portion of the first base and the first end portion of the second base, positionally adjusting the first support column along the first rail member, and positionally adjusting the second support column along the second rail member.

9. The work positioner according to claim 1, wherein the first support column extends along a first support axis and the second support column extends along a second support axis, and
wherein a distance between the first support axis of the first support column and the second support axis of the second support column is configured to be adjusted by replacing the intermediate member with a second intermediate member of a plurality of intermediate members, each of the plurality of intermediate members having a different length, the second intermediate member being removably connected to the second end portion of the first base and the first end portion of the second base.

* * * * *